(12) United States Patent
Sobanski et al.

(10) Patent No.: US 12,421,897 B2
(45) Date of Patent: Sep. 23, 2025

(54) AIRCRAFT HEAT EXCHANGER

(71) Applicant: RTX Corporation, Farmington, CT (US)

(72) Inventors: Jon Erik Sobanski, Glastonbury, CT (US); Joseph B. Staubach, Colchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/222,700

(22) Filed: Jul. 17, 2023

(65) Prior Publication Data

US 2024/0060448 A1 Feb. 22, 2024

Related U.S. Application Data

(60) Provisional application No. 63/389,587, filed on Jul. 15, 2022.

(51) Int. Cl.
*F02C 7/06* (2006.01)
*F02C 7/14* (2006.01)
(Continued)

(52) U.S. Cl.
CPC .......... *F02C 7/06* (2013.01); *F02C 7/14* (2013.01); *F28D 1/0477* (2013.01); *F28F 1/006* (2013.01);
(Continued)

(58) Field of Classification Search
CPC ........ F01D 25/12; F01D 25/125; F01D 25/18; F02C 7/06; F02C 7/14; F28D 1/0477;
(Continued)

(56) References Cited

U.S. PATENT DOCUMENTS 3,112,793 A 12/1963 Sass
4,809,774 A 3/1989 Hagemeister
(Continued)

FOREIGN PATENT DOCUMENTS

GB 559309 A 2/1944

OTHER PUBLICATIONS

Extended European Search Report dated Mar. 5, 2024 for European Patent Application No. 23185805.1.

(Continued)

*Primary Examiner* — Andrew H Nguyen
(74) *Attorney, Agent, or Firm* — Bachman & LaPointe, P.C.

(57) ABSTRACT

A heat exchanger for heat transfer between an external first flow along a first flowpath and a second flow along an internal second flowpath, has: a first manifold; a second manifold; and a plurality of tubes extending from the first manifold to the second manifold and having respective interiors bounding respective legs of the second flowpath. The plurality of tubes comprises a plurality groups of tubes. For each of the groups of the tubes: the tubes of the group have first ends mounted to the first manifold at respective first locations; and the tubes of the group have second ends mounted to the second manifold at respective second locations. From the first manifold to the second manifold, each tube has: a upstream concave first turn; an upstream convex second turn; and an upstream concave third turn; and the second locations are offset downstream along the first flowpath from the respective first locations.

18 Claims, 6 Drawing Sheets

(51) Int. Cl.
  *F28D 1/047* (2006.01)
  *F28F 1/00* (2006.01)
  *F28D 21/00* (2006.01)

(52) U.S. Cl.
  CPC .. *F28D 2021/0026* (2013.01); *F28F 2265/26* (2013.01)

(58) Field of Classification Search
  CPC .. F28D 7/08; F28D 7/082; F28D 7/085; F28F 1/006; F28F 1/08; F28F 1/022; F28F 1/025
  See application file for complete search history.

(56) References Cited

U.S. PATENT DOCUMENTS

| | | | |
|---|---|---|---|
| 5,058,663 A * | 10/1991 | Hagemeister | F28F 9/013 165/162 |
| 7,500,515 B2 | 3/2009 | Tsuji et al. | |
| 9,494,372 B2 | 11/2016 | Nehlen, III | |
| 9,976,815 B1 * | 5/2018 | Roper | F28D 7/08 |
| 10,184,400 B2 | 1/2019 | Cerny et al. | |
| 2011/0247794 A1 | 10/2011 | Arment et al. | |
| 2013/0126141 A1 * | 5/2013 | Cho | F28D 7/005 165/173 |
| 2014/0360698 A1 * | 12/2014 | Waldman | F28F 1/08 165/81 |
| 2015/0101334 A1 | 4/2015 | Bond et al. | |
| 2016/0281532 A1 | 9/2016 | Rambo et al. | |
| 2017/0089643 A1 * | 3/2017 | Arafat | F28D 9/0037 |
| 2018/0238638 A1 * | 8/2018 | Roper | B22F 7/004 |
| 2019/0170445 A1 | 6/2019 | McCaffrey | |
| 2019/0170455 A1 | 6/2019 | McCaffrey | |
| 2019/0212074 A1 | 7/2019 | Lockwood et al. | |
| 2020/0332715 A1 * | 10/2020 | Ribarov | F02C 7/14 |
| 2022/0128310 A1 | 4/2022 | Wiedenhoefer | |
| 2023/0043809 A1 * | 2/2023 | Schimmels | F28D 7/16 |
| 2024/0018904 A1 * | 1/2024 | Oriol | F02C 7/14 |

OTHER PUBLICATIONS

Partial European Search Report dated Dec. 4, 2023 for European Patent Application No. 23185805.1.

IQ Volta Series, Low Flow Proportional Valves, Feb. 28, 2020, iQ Valves Co., Melbourne Florida.

* cited by examiner

AIRCRAFT HEAT EXCHANGER

CROSS-REFERENCE TO RELATED APPLICATION

Benefit is claimed of U.S. Patent Application No. 63/389,587, filed Jul. 15, 2022, and entitled "Aircraft Heat Exchanger", the disclosure of which is incorporated by reference herein in its entirety as if set forth at length.

BACKGROUND

The disclosure relates to gas turbine engines. More particularly, the disclosure relates to gas turbine engine heat exchangers.

Gas turbine engines (used in propulsion and power applications and broadly inclusive of turbojets, turboprops, turbofans, turbo shafts, industrial gas turbines, and the like) include a variety of heat exchangers.

Examples of gas turbine engine heat exchangers are found in: United States Patent Application Publication 20190170445A1 (the '445 publication), McCaffrey, Jun. 6, 2019, "HIGH TEMPERATURE PLATE FIN HEAT EXCHANGER"; United States Patent Application Publication 20190170455A1 (the '455 publication), McCaffrey, Jun. 6, 2019, "HEAT EXCHANGER BELL MOUTH INLET"; and United States Patent Application Publication 20190212074A1 (the '074 publication), Lockwood et al., Jul. 11, 2019, "METHOD FOR MANUFACTURING A CURVED HEAT EXCHANGER USING WEDGE SHAPED SEGMENTS", the disclosures of which three publications are incorporated by reference in their entireties herein as if set forth at length.

An example positioning of such a heat exchanger provides for the transfer heat from a flow (heat donor flow) diverted from an engine core flow to a bypass flow (heat recipient flow). For example, air is often diverted from the compressor for purposes such as cooling. However, the act of compression heats the air and reduces its cooling effectiveness. Accordingly, the diverted air may be cooled in the heat exchanger to render it more suitable for cooling or other purposes. One particular example draws the heat donor airflow from a diffuser case downstream of the last compressor stage upstream of the combustor. This donor flow transfers heat to a recipient flow which is a portion of the bypass flow. To this end, the heat exchanger may be positioned within a fan duct or other bypass duct. The cooled donor flow is then returned to the engine core (e.g., radially inward through struts) to pass radially inward of the gas path and then be passed rearward for turbine section cooling including the cooling of turbine blades and vanes. The heat exchanger may conform to the bypass duct. The bypass duct is generally annular. Thus, the heat exchanger may occupy a sector of the annulus up to the full annulus.

Other heat exchangers may carry different fluids and be in different locations. For example, instead of rejecting heat to an air flow in a bypass duct, other heat exchangers may absorb heat from a core flow (e.g., as in recuperator use).

Among recently proposed annular heat exchangers are those in United States Patent Application Publication 20150101334A1 (the '334 publication), Bond et al., Apr. 16, 2015, "HEAT EXCHANGERS", U.S. Pat. No. 10,184,400 (the '400 patent), Cerny et al., Jan. 22, 2019, "Methods of cooling a fluid using an annular heat exchanger", and United States Patent Application Publication 20220128310A1 (the '310 publication), Wiedenhoefer, Apr. 28, 2022, "Tube Bank Heat Exchanger". The disclosure of the '310 publication is incorporated by reference in its entirety herein as if set forth at length.

SUMMARY

One aspect of the disclosure involves a heat exchanger for heat transfer between an external first flow along a first flowpath and a second flow along an internal second flowpath. The heat exchanger comprises: a first manifold; a second manifold; and a plurality of tubes extending from the first manifold to the second manifold and having respective interiors bounding respective legs of the second flowpath. The plurality of tubes comprises a plurality groups of tubes. For each of the groups of the tubes: the tubes of the group have first ends mounted to the first manifold at respective first locations; and the tubes of the group have second ends mounted to the second manifold at respective second locations. From the first manifold to the second manifold, each tube has: an upstream concave first turn; an upstream convex second turn; and an upstream concave third turn. The second locations are offset downstream along the first flowpath from the respective first locations.

In a further embodiment of any of the foregoing embodiments, additionally and/or alternatively: the groups of tubes form respective stages; and along the first flowpath the stages are in series; and along the second flowpath the stages are in parallel.

In a further embodiment of any of the foregoing embodiments, additionally and/or alternatively, the second locations are streamwise offset by a distance $L_O$ from the respective first locations of at least 10 millimeters or at least 2.0 times a tube outer diameter.

In a further embodiment of any of the foregoing embodiments, additionally and/or alternatively, each of the tubes has a centerline lying essentially in a respective plane.

In a further embodiment of any of the foregoing embodiments, additionally and/or alternatively, measured at centerlines of the respective tubes: the first turns do not extend downstream of the respective first locations by more than 1.0 times a tube nominal outer diameter, if at all; the second turns extend upstream of the respective first locations by a distance $L_T$ of at least 2.0 times the tube nominal outer diameter; and the third turns do not extend downstream of the respective second locations by more than 1.0 times the tube nominal outer diameter, if at all.

In a further embodiment of any of the foregoing embodiments, additionally and/or alternatively, the heat exchanger is a full annulus or an annular segment.

In a further embodiment of any of the foregoing embodiments, additionally and/or alternatively, each tube has no turn other than the first turn, the second turn, and the third turn.

In a further embodiment of any of the foregoing embodiments, additionally and/or alternatively, a gas turbine engine includes the heat exchanger and further comprises: a fan section having a fan; at least one compressor section; a combustor section positioned to receive air compressed by the at least one compressor section; and a turbine section positioned to receive combustion gas from the combustor to drive the at least one compressor section and the at least one fan section. The heat exchanger is positioned in a bypass flowpath.

In a further embodiment of any of the foregoing embodiments, additionally and/or alternatively, the gas turbine engine further comprises: an epicyclic transmission coupled to the fan; and a lubrication system having a lubricant flowpath through the epicyclic transmission and including the internal second flowpath.

In a further embodiment of any of the foregoing embodiments, additionally and/or alternatively, the gas turbine engine further comprises: a temperature sensor; and a controller coupled to receive input from the temperature sensor and controlling the lubrication system so as to increase pressure within the tubes responsive to a measured temperature increase.

In a further embodiment of any of the foregoing embodiments, additionally and/or alternatively, a method for using the heat exchanger comprises: driving a first flow along the first flowpath; driving a second flow along the second flowpath; measuring a temperature associated with at least one tube of the plurality of tubes; and controlling pressure within the plurality of tubes so as to increase the pressure responsive to a measured temperature increase.

In a further embodiment of any of the foregoing embodiments, additionally and/or alternatively, the pressure increase counters stress caused by the temperature increase.

In a further embodiment of any of the foregoing embodiments, additionally and/or alternatively, the pressure increase tends to contract the ends of each of the tubes toward each other.

A further aspect of the disclosure involves, a heat exchanger for heat transfer between an external first flow along a first flowpath and a second flow along an internal second flowpath. The heat exchanger comprises: a first manifold; a second manifold; and a plurality of tubes extending from the first manifold to the second manifold and having respective interiors bounding respective legs of the second flowpath. The plurality of tubes comprises a plurality groups of tubes. For each of the groups of the tubes: the tubes of the group have first ends mounted to the first manifold at respective first locations; the tubes of the group have second ends mounted to the second manifold at respective second locations; and the second locations are offset downstream along the first flowpath from the respective first locations. The tubes are bent so that an internal pressure increase counters stress caused by a temperature increase.

A further aspect of the disclosure involves, a heat transfer system for heat transfer between an external first flow along a first flowpath and a second flow along an internal second flowpath, the heat transfer system comprising: a heat exchanger comprising: a first manifold; a second manifold; and a plurality of tubes extending from the first manifold to the second manifold and having respective interiors bounding respective legs of the second flowpath. At least one temperature sensor is positioned to measure a temperature associated with at least one tube of the plurality of tubes. Means control pressure within the plurality of tubes. A controller is coupled to receive input from the temperature sensor and control the means so as to increase the pressure responsive to a measured temperature increase.

In a further embodiment of any of the foregoing embodiments, additionally and/or alternatively, the tubes each have a plurality of bends; and the pressure increase counters stress caused by the temperature increase.

In a further embodiment of any of the foregoing embodiments, additionally and/or alternatively, the plurality of tubes comprises a plurality groups of tubes. For each of the groups of the tubes: the tubes of the group have first ends mounted to the first manifold; and the tubes of the group have second ends mounted to the second manifold.

In a further embodiment of any of the foregoing embodiments, additionally and/or alternatively, the at least one temperature sensor is positioned in the first flowpath downstream of the plurality of tubes.

In a further embodiment of any of the foregoing embodiments, additionally and/or alternatively, a gas turbine engine includes the heat transfer system and further comprises: at least one compressor section; a combustor section positioned to receive air compressed by the at least one compressor section; and a turbine section positioned to receive combustion gas from the combustor to drive the compressor. The heat exchanger is positioned in a bypass duct.

In a further embodiment of any of the foregoing embodiments, additionally and/or alternatively, a method for using the heat transfer system comprises: driving a first flow along the first flowpath; driving a second flow along the second flowpath; measuring a temperature associated with at least one tube of the plurality of tubes; and controlling pressure within the plurality of tubes so as to increase the pressure responsive to a measured temperature increase.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
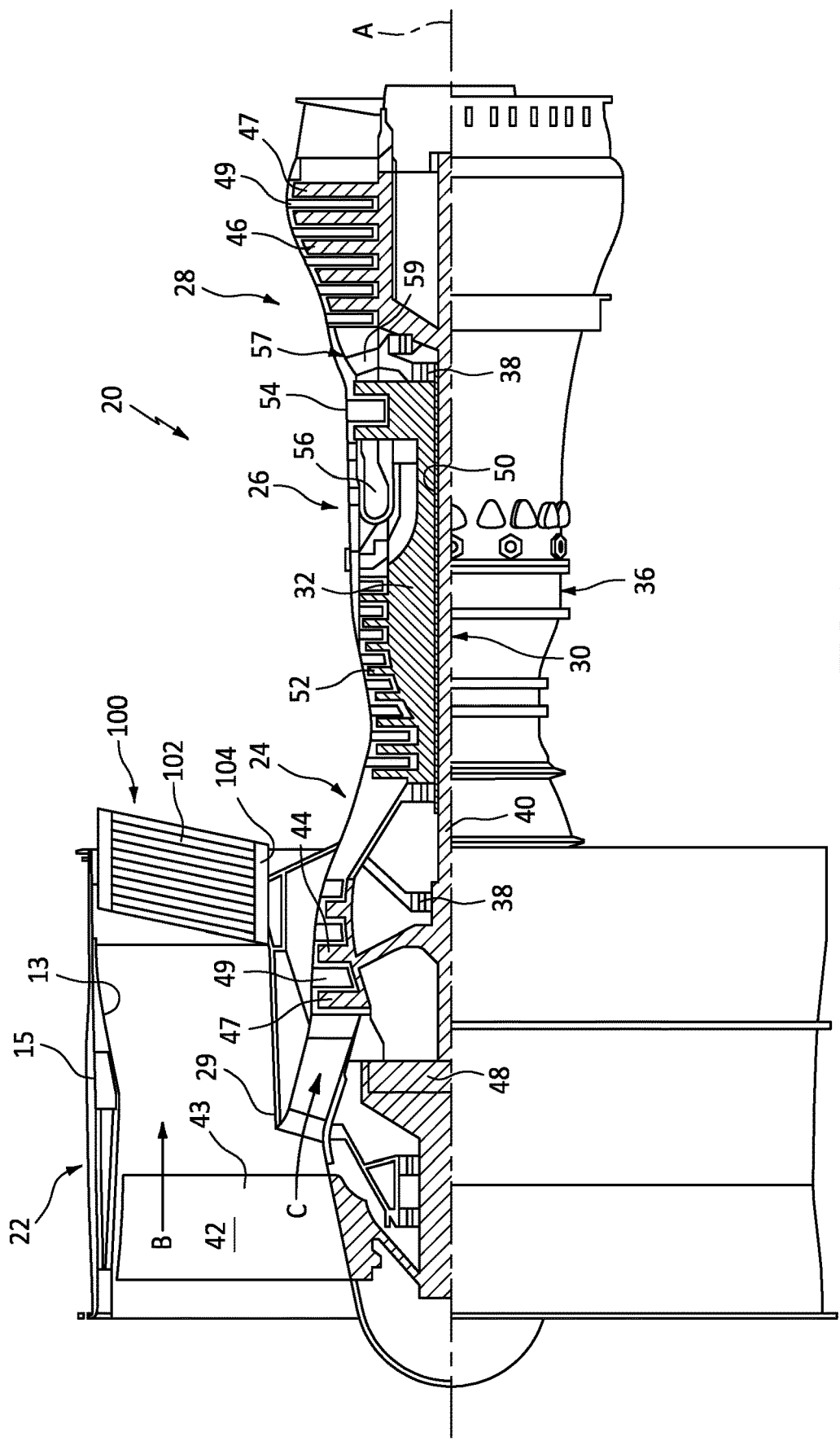
FIG. 1 is a schematic sectional view of a gas turbine engine.

Several considerations are involved in engineering the tubes of a heat exchanger such as that of the '310 publication. On the one hand, the tube configuration may be made relatively flexible (non-stiff) to accommodate/address several fatigue dynamics. First, it addresses thermo-mechanical fatigue (TMF) caused by differential thermal expansion and associated. Second, it addresses low cycle fatigue (LCF) caused by aerodynamic loads and internal pressures.

However, on the other hand, it may be desirable to have sufficient stiffness to avoid fluid or other vibration-induced resonance by staying above critical modes induced by shedding vortices and engine rotordynamics and thereby limit associated high cycle fatigue (HCF).

The typical situation of differential thermal expansion is that transitioning from relatively non-running conditions to running conditions causes a heating of the tubes that would be associated with a greater lengthening (end-to-end separation) than the associated change in manifold separation. In such a situation, to accommodate this differential thermal expansion, the tubes of the '310 publication would flex so that the centers of their arcs shift further downstream along the external (e.g., air or exhaust) flowpath. Nevertheless, this accommodation only partially reduces the stress relative to what would be present with straight tube sections.

We have determined that a particular dynamic involving tube curvature may be utilized to further reduce stresses. In particular, the tubes may be configured so that increased internal pressure will tend to contract the tube ends toward each other rather than expand the tube ends away from each other (e.g., rather than straightening the tube). Specifically, at a turn/bend, the outside of the turn will offer a greater surface area for internal pressure to act upon than does the inside. Pressure increases will tend to tighten the curvature. Thus, when differential thermal expansion causes a certain compressive stress along the length of the tube, increasing pressure within the tube may reduce the compressive stresses. This dynamic allows a control system to control the pressure in response to sensed temperature. In one group of examples, temperature is taken as a given (e.g., a temperature dictated by a baseline control algorithm). The control system may then control to target a particular target pressure or remain within a target pressure range.

In a reengineering situation, the tube geometry may be designed and analyzed (e.g., via engineering simulation software and/or hardware experimentation) to provide a desired amount of control over pressure-induced contraction in an available pressure domain (e.g., within the material strength of available tubestock). Example pressure increases will depend on the particular application. As is discussed further below, a key aspect involves a streamwise relative shift/offset (along the external flowpath) of the ends of the tube (e.g., the ID end and the OD end in an annular heat exchanger or an annular segment heat exchanger). This axial shift helps accommodate strain in the tube (and avoid buckling loads) relative to a more simple bow as in the '310 publication. It also increases torsional rigidity, particularly against dynamic loading via aerodynamic forces.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the example gas turbine engine 20 is illustrated as a geared architecture 48 to drive the fan 42 at a lower speed than the low speed spool 30. The inner shaft 40 may interconnect the low pressure compressor (LPC) 44 and low pressure turbine (LPT) 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor (HPC) 52 and a second (or high) pressure turbine (HPT) 54. A combustor 56 is arranged in the example gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only example of one embodiment of a geared architecture engine and that the present disclosure is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "Low corrected fan tip speed" is the actual fan tip speed in ft/sec divided by an industry standard temperature correction of $[(Tram\ °\ R)/(518.7°\ R)]^{0.5}$. The "low corrected fan tip speed" can be less than or equal to 1150.0 ft/second (350.5 meters/second), and greater than or equal to 1000.0 ft/second (304.8 meters/second).

FIG. 1 shows a heat exchanger 100 having a plurality of tubes 102 in an example position in the bypass duct 13 extending across the bypass flowpath B between a first manifold 104 and a second manifold 106. In the example implementation, the first manifold is an inner diameter (ID) manifold and the second manifold is an outer diameter (OD) manifold. The ID manifold has an OD wall 108 (FIG. 1A) along the gaspath and the OD manifold has an ID wall 110 along the gaspath.

Figure 1A:
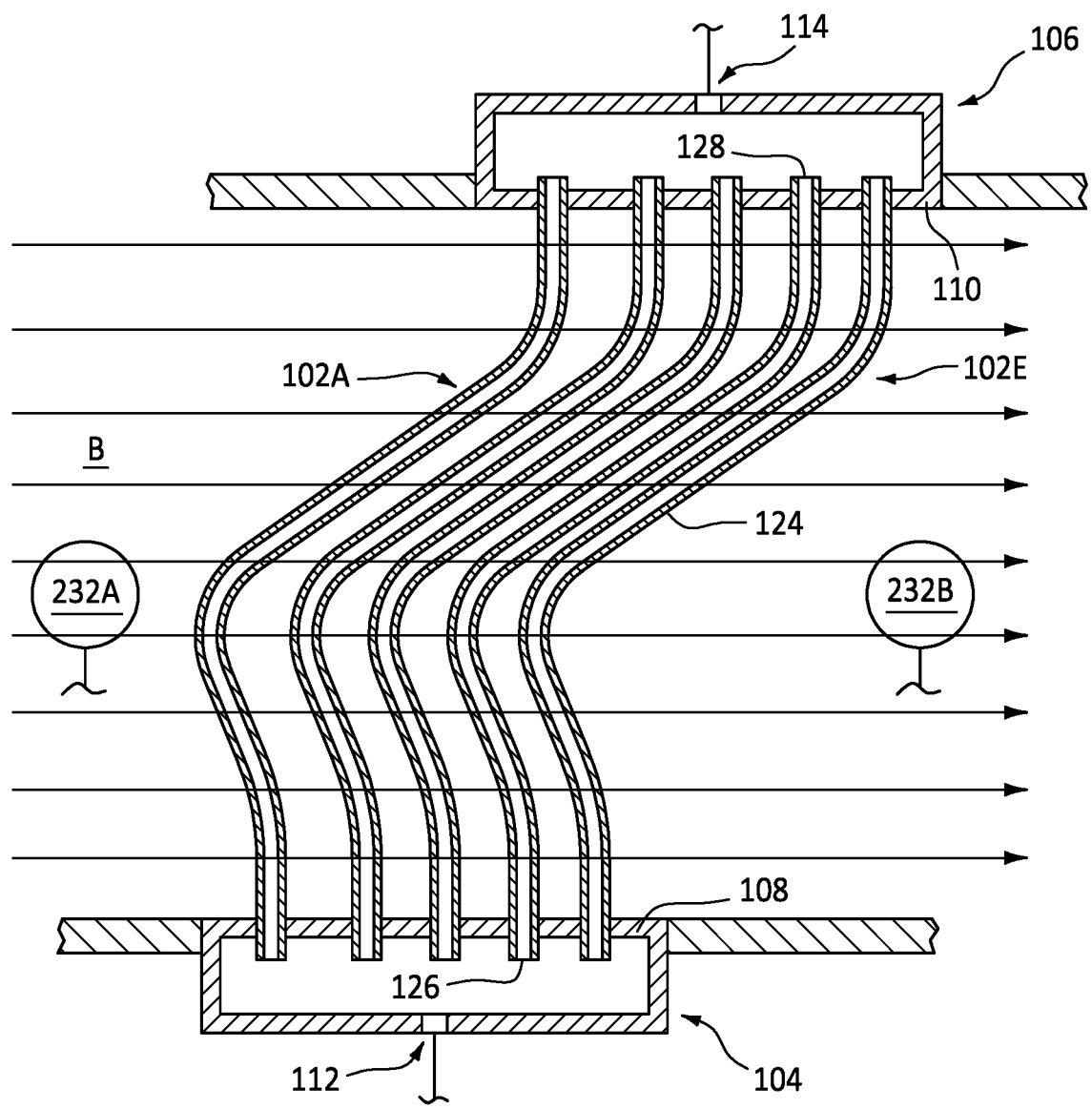
FIG. 1A is an enlarged view of a bypass duct heat exchanger in the engine.

As is discussed further below, the tubes may be positioned in multiple stages from upstream to downstream along the bypass flowpath, each stage having multiple tubes circumferentially spaced from each other. FIG. 1A shows an example five stages 102A-102E from upstream to downstream. An example number of stages is at least four or at least five or an example four to 150 or five to 120 (see axial segmentation discussion below). An example number of tubes per stage is at least ten or at least twenty or ten to three hundred or twenty to two hundred. As is discussed further below, in the example implementation, one manifold is an inlet manifold and the other manifold is an outlet manifold. In alternative examples, one manifold may be a combined inlet and outlet manifold and the other may be a turn manifold. In yet other alternative examples, one manifold may be an inlet manifold and the other an outlet manifold but both also contain turns. In the illustrated example, the heat exchanger inlet is labelled 112 and a heat exchanger outlet is labelled 114. The example inlet is shown on the ID manifold 104 and the example outlet is shown on the OD manifold 106.

Figure 2:
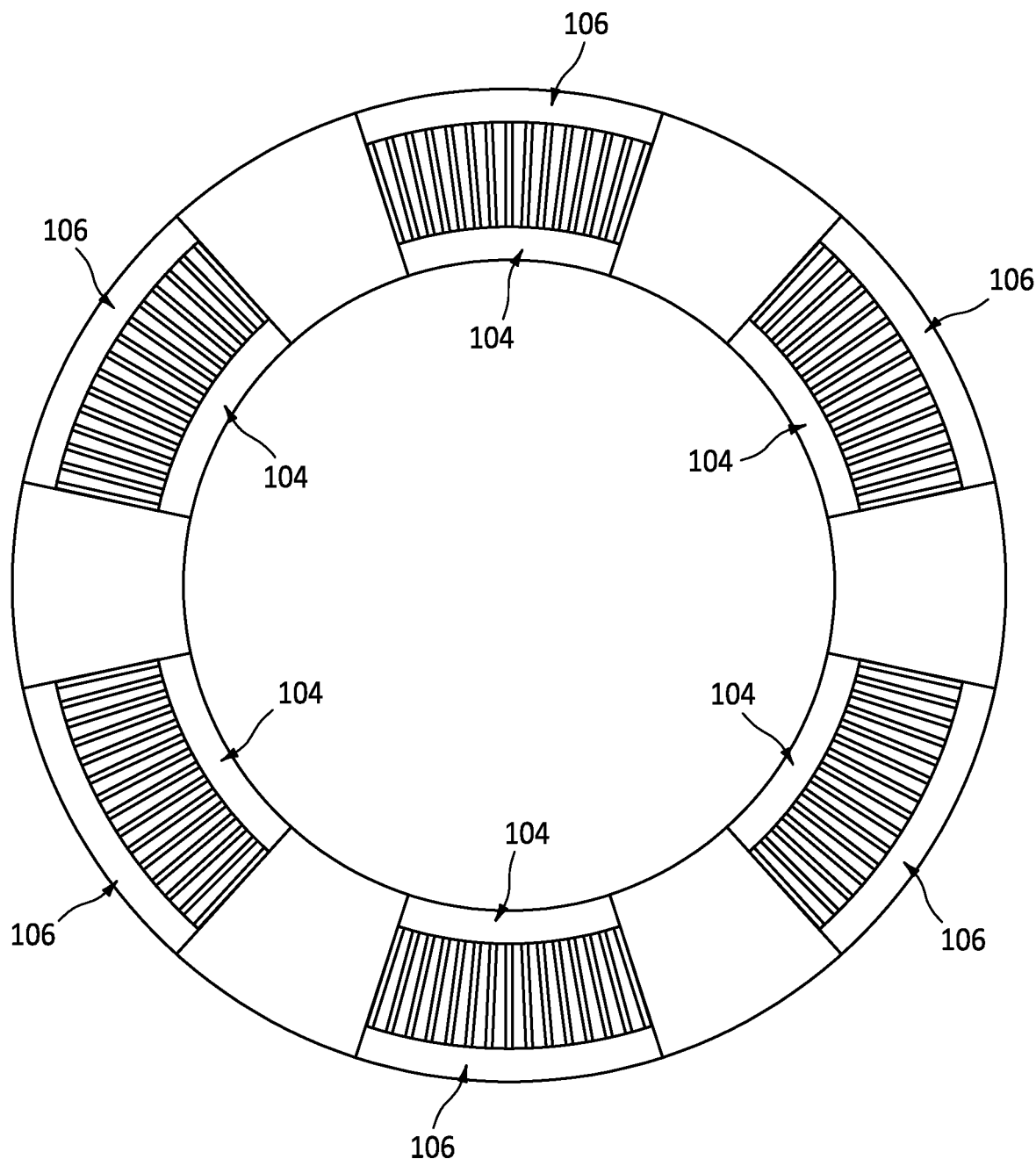
FIG. 2 is a schematicized end view of a circumferentially segmented heat exchanger.

The manifolds and heat exchanger may from a full continuous annulus, a circumferentially segmented full annulus or one or more annular segments totaling substantially less than a full annulus. Example circumferential/annular segments/sectors may each represent an example at least 10° about the engine centerline (e.g., 10° to 90°). An example essential/substantial full annulus may have four to twenty segments (more narrowly four to twelve) either contacting end-to-end or end-to-end with gaps such as for structural members, plumbing, and the like. Example gaps are smaller in circumferential span than the segments. FIG. 2 shows such an example of six 36° segments/sectors with 24° gaps between circumferential ends. For low load applications, the heat exchanger may occupy only a single small sector.

Axial segmentation (additional to or alternatively to) may also ease assembly and/or may be used to isolate leaks or allow differential control over different axial segments. This may be particularly relevant to the higher stage counts noted above. For example consider ten to thirty end-to-end axially-arrayed groups of HX circumferential segments of FIG. 1B each having four to six stages of tubes.

Figure 1B:
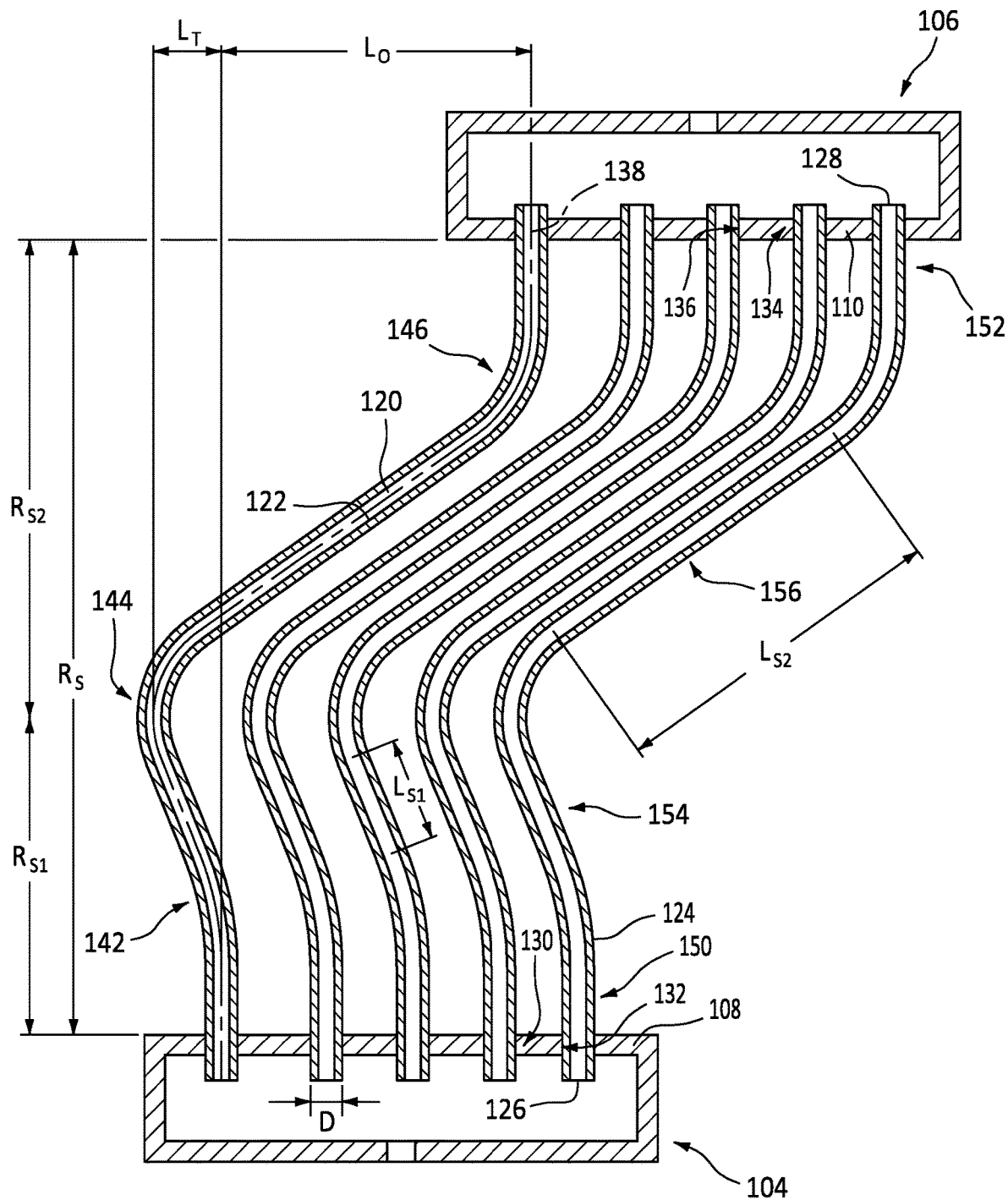
FIG. 1B is a further enlarged view of the bypass duct heat exchanger.

As is discussed below, the manifolds are streamwise offset from each other along the bypass flowpath B. In the illustrated example, the OD manifold 106 is downstream offset from the ID manifold 104. Each tube 102 has an interior 120 (FIG. 1B) bounded by an inner/interior/ID surface 122. Each tube 102 also has an outer/exterior/OD surface 124. Each example tube extends from a first end 126 to a second end 128. In the illustrated example, each tube 102 has a first end portion 130 mounted to the ID manifold 104 OD wall 108 (e.g., to a socket 132) and a second end portion 134 mounted to the OD manifold 106 ID wall 110 (e.g., to a socket 136). Each example tube has a centerline 138. For each tube, the OD manifold connection location is offset from the associated ID manifold connection location by a streamwise length $L_O$ downstream along the bypass flowpath B (e.g. measured on-center using the tube centerline at entry to the associated manifold wall). FIG. 1B also shows a radial span $R_S$ of the tubes. FIG. 1B shows a nominal tube outer diameter D.

Each centerline 138 lies essentially in a respective plane. This may have any of several advantages. First is manufacturability (of individual bent tubes) and ease of assembly (of the tubes into an array). Also, it may reduce or limit aerodynamic loads such as might twist the tubes (a lateral/tangential protrusion would create a more significant lever arm for aerodynamic loads about an axis between the mounting locations/end portions).

Measured at the tube centerlines and proceeding from the ID manifold 104 to the OD manifold 106, the tubes turn upstream and then back downstream. This involves a first turn (formed by a first bend) 142 upstream (concave-forward/upstream aka upstream-concave or forward-concave), a second turn (formed by a second bend) 144 back downstream (convex-forward/upstream), and a third turn (formed by a third bend) 146 at least partially back upstream (concave-forward/upstream) (although not necessarily sufficiently reversing direction to be absolutely upstream). Thus, the upstream-most extent of the tube centerline (at the second turn 144) is upstream/forward of the first end portion 130 and associated socket by a distance $L_T$. That location is also a transverse distance $R_{S1}$ from the first manifold 110 and $R_{S2}$ from the second manifold 112. FIG. 1B also shows short straight terminal portions 150 and 152 (respectively including the end portions 130 and 134) and straight intermediate portions 154 and 156.

Example tube materials are alloys and will depend on the particular application. Material may be maintained when revising from a baseline straight-tube configuration. With an example bypass duct heat exchanger, example tube material is a stainless steel or a nickel-based superalloy such as Inconel® alloy 625 (UNS designation N06625; W.Nr. 2.4856) of Special Metals Corporation/Huntington Alloys Corporation of Huntington, West Virginia.

Example tube outer diameter D is 1.0 millimeters to 10.0 millimeters, more narrowly 1.0 millimeters to 6.0 millimeters or 3.5 millimeters to 5.5 millimeters.

Example end-to-end offset $L_O$ is at least 10 millimeters, more narrowly 10 millimeters to 60 millimeters or 15 millimeters to 45 millimeters or 15 millimeters to 35 millimeters, or an example 25 millimeters. Alternatively or additionally, example $L_O$ is at least 2.0 times tube outer diameter D, more narrowly, at least 5.0 times or 5.0 to 20 times or 8.0 to 20 times.

Example second turn offset $L_T$ is at least 1.0 millimeters, more narrowly 1.0 millimeter to 150 millimeters or 3.0 millimeters to 80 millimeters or 3.0 millimeters to 40 millimeters, or an example 15 millimeters. Alternatively or additionally, example $L_T$ is at least 1.0 times tube outer diameter D, more narrowly, at least 2.0 times or at least 3.0 times or 1.0 to 8.0 times or 1.0 to 6.0 times or 1.5 to 4.0 times or 2.0 to 3.0 times. This relatively small forward shift $L_T$ limits the lever arm about the first end portion 130 (and about a diagonal axis between end portions 130 and 134) to limit aerodynamically-induced dynamic torsional loads.

Example radial span $R_S$ is 75 millimeters to 300 millimeters, more narrowly 75 millimeters to 150 millimeters or 75 millimeters to 125 millimeters, or an example 100 millimeters.

Example $R_S$ to D ratio is 10:1 to 80:1, more narrowly 20:1 to 60:1 or 30:1 to 50:1, or an example 40:1.

Example $R_S$ to $L_O$ ratio is 1:1 to 20:1, more narrowly 3:2 to 10:1, or 2:1 to 5:1 or an example 4:1.

Example $R_{S1}$ is 10 millimeters to 200 millimeters, more narrowly 25 millimeters to 50 millimeters, or an example 40 millimeters.

Example $R_{S1}$ to $R_{S2}$ ratio is 1:1 to 1:10, more narrowly 1:2 to 1:4, or an example 2:5.

The example second straight intermediate portion 156 is shown having a length $L_{S2}$ greater than a length $L_{S1}$ of the first straight intermediate portion 154 (e.g., $L_{S2}$ is at least 115% of $L_{S1}$ or 115% to 500% or 150% to 400% or 200% to 300%).

The example tubes do not turn downstream before the second turn and do not extend downstream of their second ends 128. This helps provide rigidity by limiting the effective lever arms discussed above. More generally, the first turns do not extend downstream of the respective first ends 126 by more than 1.0 times (more narrowly 0.5 times) the tube nominal outer diameter D, if at all. Similarly, the third turns do not extend downstream of the respective second locations by more than 1.0 times (more narrowly 0.5 times) the tube nominal outer diameter D, if at all.

Whereas a straight radial tube would thermally expand in radial span upon heating, the example tube may at least partially contract (e.g., if not absolutely contract, expand less than predicted by the CTE multiplied by temperature change). Specifically, the curvature and projected area on the outer radius portion of turns/bends has a greater surface area and thus a greater force is applied to it when internally pressurized than inner radius portions. The mismatch in area between the outer radius of a bent portion and the inner radius of the bent portion causes the tube to want to curl inward.

Figure 3:
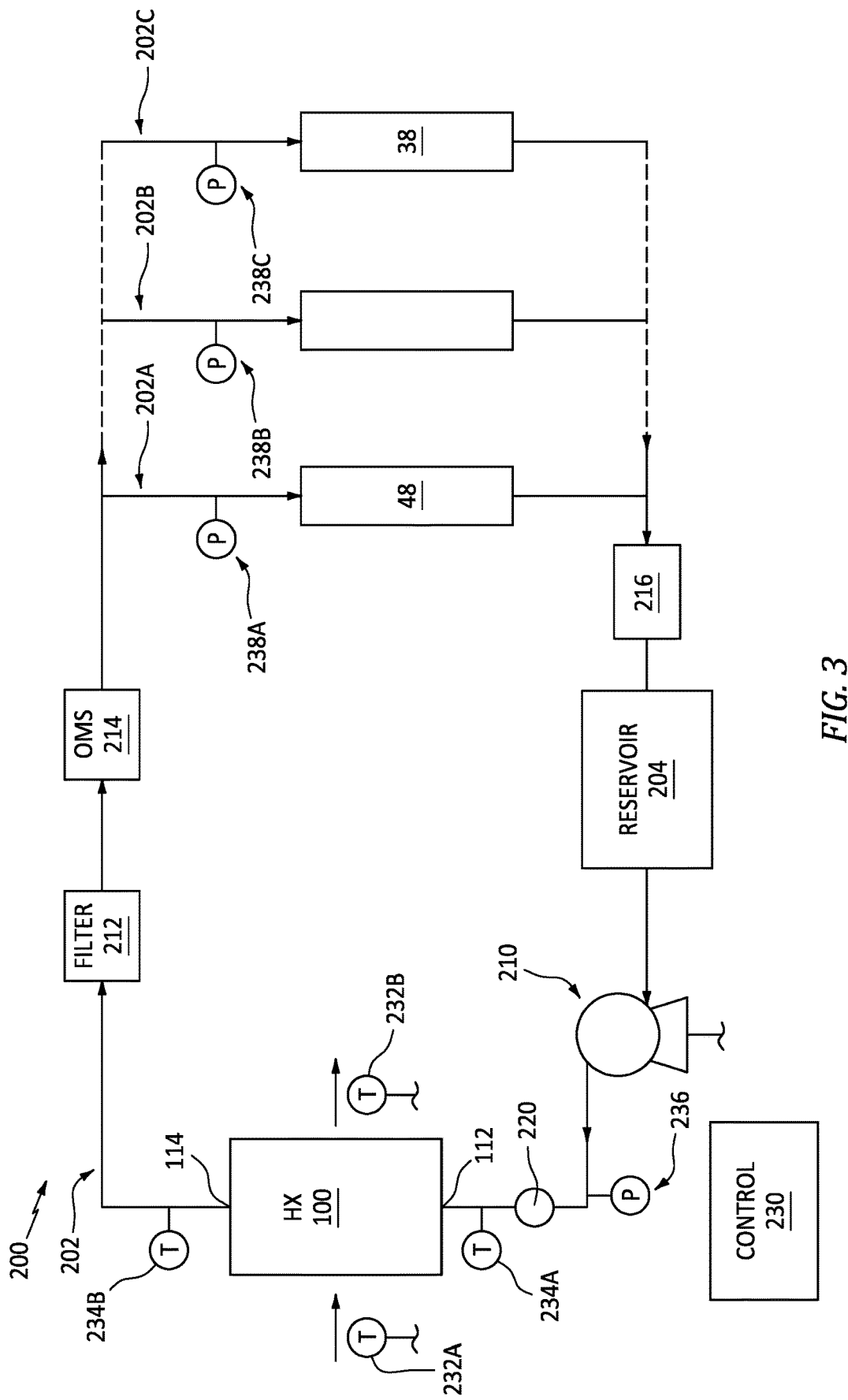
FIG. 3 is a schematic view of a transmission lubrication system of the engine.

FIG. 3 schematically shows a lubrication system 200 delivering cooled lubricant (e.g., oil) to lubrication loads (e.g., the transmission 48, the bearing systems 38, and other loads such as accessory gearboxes) and returning/collecting heated oil.

The oil is ultimately cooled in the heat exchanger 100. The example system 200 is shown as having a recirculating loop 202 and includes a reservoir 204. The loop 202 also contains a pump 210. The example loop also includes a filter 212, an oil monitoring system (OMS) 214, and a deaerator 216 among other possible conventional components.

The loop also includes a pressure regulator 220. An example pressure regulator is a digitally controlled variable oil reduction valve (e.g., a proportional valve such as a servo-driven or solenoid proportional valve).

The example pump and pressure regulator may be controlled by a controller 230. The controller 230 may receive temperature input from one or more temperature sensors and/or one or more pressure sensors. Example temperature sensors include HX external flow inlet temperature sensor 232A and outlet temperature sensor 232B (e.g., in the bypass flowpath respectively just upstream and just downstream of the tube bank) and HX internal flow inlet temperature sensor 234A and outlet temperature sensor 234B. Additional or alternative external flow temperature sensors may be at intermediate locations (e.g., between stages). The temperature sensors may be utilized to determine the temperature of or otherwise associated with the tubes. Example temperature sensors are thermocouples. Direct measurement may include one or more thermocouples (not shown) on or in the tube(s). Sensors upstream or downstream of the tubes on either flowpath may measure an associated temperature which can serve as a proxy for or estimate of tube temperature.

FIG. 3 shows pressure sensor 236 in the loop 202 positioned to measure pressure in the HX 100. The example pressure sensor 236 is just upstream of the HX. Optionally, additional pressure sensors 238A, 238B, 238C are in respective branches of the loop through the loads. Example pressure sensors are pressure transducers (e.g., piezoelectric).

The example controller is the full authority digital engine control (FADEC) of the engine or otherwise integrated therewith or in communication therewith.

The illustrated FIG. 3 pressure regulator upstream of the inlet manifold may regulate pressure by electrically controlled actuation stepping down pressure relative to a high output pressure of the pump. The pump may have a fixed speed ratio relative to the engine accessory drive and may be configured to always provide excess pressure.

In use, an example implementation involves a remanufacturing or redesign of a baseline system that has a baseline heat exchanger for either heating or cooling an internal flow depending upon the application. As noted above, examples of cooling include oil cooling and examples of heating include recuperator use and fuel preheating. The baseline system will have its own control algorithm for delivering the desired amount of specific temperature internal flow and/or external flow.

The core of the baseline control algorithm may transfer over to use with an offset tube configuration. One example of the baseline control is to yield a specific target oil outlet temperature measured by the sensor 234B. In one group of examples, a feedback control routine may be added atop the baseline control algorithm to add control of internal pressure in the tubes. For example, the baseline may control to a specific target (which may be condition-dependent) outlet manifold temperature (via 234B) and optionally a flow rate of at least a target value, without reference to pressure. In some embodiments, the added routine may target a specific temperature-dependent internal tube pressure determined to counter effects of thermal expansion (e.g., while also providing the same target outlet manifold temperature as the baseline—depending on implementation the baseline flow rate may be maintained or changed). The temperature dependency may involve a single temperature, a composite, or a function (e.g., difference). A single temperature example may be the internal fluid inlet temperature (e.g., measured via 234A) or the external fluid outlet temperature (e.g., measured via 232B). A simple composite might average those two. A function could involve the difference of such a temperature or composite relative to the internal fluid outlet temperature.

In one group of implementations, the controller may be programmed with a look-up table of target pressures vs. measured temperature.

In one example of a hot shutdown situation, the external flow cools the internal flow before shutdown. The manifold having greater thermal mass (than the tubes) would heat soak prior to shutdown and then cool slower than the tubes when the hot internal flow ceased. With baseline straight radial tubes, the thermal contraction of the tubes relative to the manifold could strain the tubes via elongation. With tubes like the '310 publication, the tubes can straighten slightly. However, the tight turns at the end of the long main arc of the '310 publication do not sufficiently counter the deformation of the main arc. The result may have the end portions shift in relative orientation.

In a rapid start up situation, the opposite could occur. The tubes would expand faster than the manifolds would allow, creating a buckling situation for straight tubes. With tubes like the '310 publication, the tubes can further bend slightly but still are subject to high strains. However, the present offsets can limit the bucking strain.

With the bent tubes, however, there is natural strain relief in the geometry, this mitigates fast start up or hot shut down scenario as the tube will flex before thermal loads impart undesirable stresses.

Engineering simulation software may be used to model tube behavior to engineer tube configuration and the associated pressure-temperature relationship(s) to be used in the control routine. Example engineering simulation software is ANSYS® engineering simulation software of ANSYS, Inc. Middlebury, Connecticut.

Figure 4:
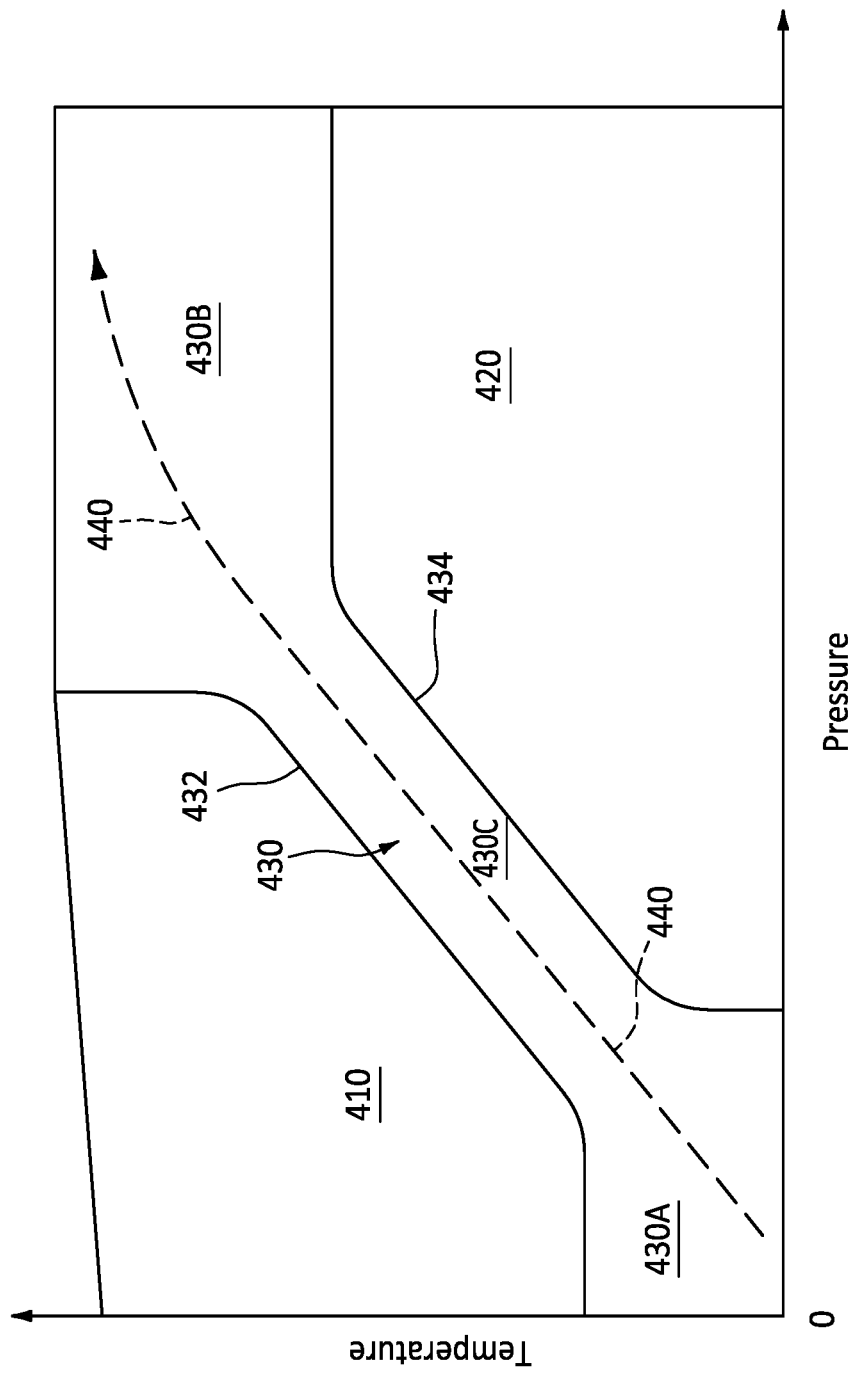
FIG. 4 is a schematicized plot of pressure v. temperature showing an example zone of acceptable LCF and HCF performance.

FIG. 4 shows an example plot of pressure versus temperature. Example temperature is a single measured temperature of the internal flow (e.g., at the inlet manifold via 234A). However other examples including a temperature composite are possible (e.g., see discussion above).

FIG. 4 shows several zones. A generally high temperature/low pressure zone 410 represents a no-go zone wherein HCF failures are likely to occur. Specifically, as temperature increases, modulus and stiffness of tube material decrease. Stiffness decrease decreases the natural frequency of the tubes and makes them more susceptible to excitation.

In contrast, a relatively low temperature/high pressure zone 420 represents a no-go zone wherein LCF failures are likely to occur. Specifically, at high pressure and low temperature, the pressure-induced contraction (caused by tightening of curvature at the turns) exceeds the thermally induced expansion, thus placing the tubes under higher steady-state stress.

An acceptable zone 430 falls generally between the zones 410 and 420. The example acceptable zone has a relatively broad low temperature/low pressure region 430A. In this region the internal pressure and the external temperature environment of the tube create a balance between CTE induced thermal expansion and pressure curling strain.

FIG. 4 also has a relatively broad high temperature/high pressure region 430B. In this region computer modelling indicates that the temperature to pressure dependency is less sensitive at higher values (thus the divergence relative to an intermediate region 430C).

The intermediate region 430C is relatively necked and may be narrower (e.g., a smaller $\Delta P$ at a given $\Delta T$ and a smaller $\Delta T$ at a given $\Delta P$). This necking is believed associated with the higher sensitivity noted above.

A plot such as FIG. 4 may be generated via engineering simulation software (e.g., ANSYS® engineering simulation software) along with hardware validation (e.g., including measuring actual stresses across the pressure-temperature regime). With such a plot, a nominal target pressure-temperature curve 440 may be created and the control system may target that curve (e.g., as a function or via a look-up table or other database). Alternatively, the boundaries of the zone 430 may be in equations or such a database and feedback control may be used to keep within the zone 430. For example, upon detecting a breach of a boundary 432 with the zone 410, the controller may increment pressure in a feedback loop until the measured value is within the zone. Similarly, upon breaching the boundary 434 with the zone 420, the control system may decrement pressure.

Component materials and manufacture techniques and assembly techniques may be otherwise conventional. in addition to manifold assemblies such as in the '310 publication (e.g., with tubes sandwiched in pockets formed between adjacent manifold plates), manifolds may be preformed with holes as pockets and the tubes inserted (locally parallel to their respective centerlines). Manifolds or their components may be cast or machined (e.g., as multiple sections which may then be assembled by brazing, welding, or the like). Additionally, particularly advantageous tube forming (shaping) methods involve hot forming or post-cold-forming heat treat to reduce or eliminate residual stress. Furthermore cross-sectional circularity is desirable and hot forming may be particularly amenable to this. Tubes may be secured in place in the manifold sockets/pockets via interference fitting, brazing, welding, or the like.

Myriad variations are possible. These include variations such as disclosed in the '310 publication. As in the '310 publication, the example heat exchanger may be formed as an annular segmented heat exchanger (e.g., when viewed from upstream or downstream, the tubes extend radially and thus diverge from the inner manifold to the outer manifold). However, other applications may involve other transverse footprints. For example, the footprint may be non-arcuate such as extending across a generally rectangular cross-section duct. In such a situation, tubes in each stage may be parallel when viewed from upstream to downstream along the external flowpath.

In the illustrated example, the tubes of each stage are registered in phase with the tubes of the adjacent stage(s) (i.e., a tube of each stage is immediately in front of or behind a tube of the adjacent stage(s)). Alternatively, they may be out-of-phase such as shown in the '310 publication (e.g., with two sets of stages alternatingly exactly out of phase with each other).

Although the example tube stages are fluidically in parallel with each other (along the internal flowpath so as to define branches that diverge and merge), alternatives may involve full or partial series. For example, in a full series situation, flow proceeds sequentially through every stage (e.g., merging and then diverging in/from a respective interstage turn plenum of one of the manifolds). In partial series, flow may proceed in parallel through groups of stages but in series through the stages of each group. Full series or partial series implementations may be relevant where one of the manifolds serves as both an inlet and outlet manifold and the other serves only as a turn manifold.

As noted above, alternative implementations may involve situations wherein rather than serving as a heat rejection heat exchanger for the internal flow, the heat exchanger serves as a heat absorption heat exchanger for the internal flow (e.g., fuel preheating or certain recuperator uses). Depending upon conditions, the thermal dynamics may be the same or different on heat absorbing and heat rejecting implementations. For example, in key implementations of both situations, the heat exchanger's operating temperature will exceed an external environmental temperature (ambient ground temperature or external in-flight temperature). Thus, for example, with the two alternatives of an oil cooler and a fuel preheater, steady-state operating temperatures will be above ambient/external temperature. Thus, both may have similar start-up and shutdown considerations. However, certain issues of insulation or thermal isolation of the manifolds may alter the dynamic.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A heat exchanger for heat transfer between an external first flow along a first flowpath and a second flow along an internal second flowpath, the heat exchanger comprising:
   a first manifold;
   a second manifold; and
   a plurality of tubes extending from the first manifold to the second manifold and having respective interiors bounding respective legs of the second flowpath, wherein:
   the plurality of tubes comprises a plurality of groups of tubes;
   for each of the groups of the tubes:
   the tubes of the group have first ends mounted to the first manifold at respective first locations; and
   the tubes of the group have second ends mounted to the second manifold at respective second locations;
   from the first manifold to the second manifold, each tube has:
   an upstream concave first turn relative to the first flow;
   an upstream convex second turn relative to the first flow; and
   an upstream concave third turn relative to the first flow; and
   the second locations are offset downstream along the first flowpath from the respective first locations and each tube has no turn other than the first turn, the second turn, and the third turn.

2. The heat exchanger of claim 1 wherein:
   the groups of tubes form respective stages; and
   along the first flowpath the stages are in series; and
   along the second flowpath the stages are in parallel.

3. The heat exchanger of claim 1 wherein:
   the second locations are streamwise offset by a distance Lo from the respective first locations of at least 10 millimeters or at least 2.0 times a tube outer diameter.

4. The heat exchanger of claim 1 wherein:
   each of the tubes has a centerline lying essentially in a respective plane.

5. The heat exchanger of claim 1 wherein measured at centerlines of the respective tubes:
   the first turns do not extend downstream of the respective first locations by more than 1.0 times a tube nominal outer diameter, if at all;
   the second turns extend upstream of the respective first locations by a distance $L_T$ of at least 2.0 times the tube nominal outer diameter; and
   the third turns do not extend downstream of the respective second locations by more than 1.0 times the tube nominal outer diameter, if at all.

6. The heat exchanger of claim 1 wherein:
   the heat exchanger is a full annulus or an annular segment.

7. A gas turbine engine including the heat exchanger of claim 1 and further comprising:
   a fan section having a fan;
   at least one compressor section;
   a combustor section positioned to receive air compressed by the at least one compressor section; and
   a turbine section positioned to receive combustion gas from the combustor to drive the at least one compressor section and the at least one fan section,
   wherein:
   the heat exchanger is positioned in a bypass flowpath.

8. The gas turbine engine of claim 7 further comprising:
   an epicyclic transmission coupled to the fan; and
   a lubrication system having a lubricant flowpath through the epicylic transmission and including the internal second flowpath.

9. The gas turbine engine of claim 8 further comprising:
   a temperature sensor; and
   a controller coupled to receive input from the temperature sensor and controlling the lubrication system so as to increase pressure within the tubes responsive to a measured temperature increase.

10. A method for using the heat exchanger of claim 1, the method comprising:
    driving the first flow along the first flowpath;
    driving the second flow along the second flowpath;
    measuring a temperature associated with at least one tube of the plurality of tubes; and
    controlling pressure within the plurality of tubes so as to increase the pressure responsive to a measured temperature increase.

11. The method of claim 10 wherein:
the pressure increase counters stress caused by the temperature increase.

12. The method of claim 10 wherein:
the pressure increase tends to contract the ends of each of the tubes toward each other.

13. A heat exchanger for heat transfer between an external first flow along a first flowpath and a second flow along an internal second flowpath, the heat exchanger comprising:
a first manifold;
a second manifold; and
a plurality of tubes extending from the first manifold to the second manifold and having respective interiors bounding respective legs of the second flowpath, wherein:
the plurality of tubes comprises a plurality of groups of tubes;
for each of the groups of the tubes:
the tubes of the group have first ends mounted to the first manifold at respective first locations;
the tubes of the group have second ends mounted to the second manifold at respective second locations;
from the first manifold to the second manifold, each tube has:
an upstream concave first turn relative to the first flow;
an upstream convex second turn relative to the first flow; and
an upstream concave third turn relative to the first flow; and
the second locations are offset downstream along the first flowpath from the respective first locations and each tube has no turn other than the first turn, the second turn, and the third turn; and
the tubes are bent so that an internal pressure increase counters stress caused by a temperature increase.

14. A heat transfer system for heat transfer between an external first flow along a first flowpath and a second flow along an internal second flowpath, the heat transfer system comprising:
a heat exchanger comprising:
a first manifold;
a second manifold; and
a plurality of tubes extending from the first manifold to the second manifold and having respective interiors bounding respective legs of the second flowpath, wherein:
each of the tubes have first ends mounted to the first manifold at respective first locations;
each of the tubes have second ends mounted to the second manifold at respective second locations;
from the first manifold to the second manifold, each tube has:
an upstream concave first turn relative to the first flow;
an upstream convex second turn relative to the first flow; and
an upstream concave third turn relative to the first flow; and
the second locations are offset downstream along the first flowpath from the respective first locations and each tube has no turn other than the first turn, the second turn, and the third turn;
at least one temperature sensor positioned to measure a temperature associated with at least one tube of the plurality of tubes;
means for controlling pressure within the plurality of tubes; and
a controller coupled to receive input from the at least one temperature sensor and controlling the means so as to increase the pressure responsive to a measured temperature increase.

15. The heat transfer system of claim 14 wherein:
the pressure increase counters stress caused by the temperature increase.

16. The heat transfer system of claim 14 wherein:
the at least one temperature sensor is positioned in the first flowpath downstream of the plurality of tubes.

17. A gas turbine engine including the system of claim 14 and further comprising:
at least one compressor section;
a combustor section positioned to receive air compressed by the at least one compressor section; and
a turbine section positioned to receive combustion gas from the combustor to drive the at least one compressor section,
wherein:
the heat exchanger is positioned in a bypass duct.

18. A method for using the heat transfer system of claim 14, the method comprising:
driving the first flow along the first flowpath;
driving the second flow along the second flowpath;
measuring a temperature associated with at least one tube of the plurality of tubes; and
controlling pressure within the plurality of tubes so as to increase the pressure responsive to a measured temperature increase.

\* \* \* \* \*